United States Patent
Taguchi et al.

(10) Patent No.: US 6,359,842 B1
(45) Date of Patent: Mar. 19, 2002

(54) DISC HAVING A SEMICONDUCTOR MEMORY

(75) Inventors: Hirofumi Taguchi, Yokohama; Shigemitsu Higuchi, Fujisawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,941

(22) Filed: Oct. 21, 1999

(30) Foreign Application Priority Data

Oct. 22, 1998 (JP) ............................................ 10-300636

(51) Int. Cl.$^7$ ............................................... G11B 11/00
(52) U.S. Cl. ........................................................ 369/14
(58) Field of Search ........................... 369/14, 13, 275.3, 369/275.4, 275.1, 288, 273; 360/133, 135; 713/200; 710/59; 235/380

(56) References Cited

U.S. PATENT DOCUMENTS

| | | |
|---|---|---|
| 5,119,353 A | 6/1992 | Asakura |
| 5,423,054 A * | 6/1995 | Schmidt et al. ............. 395/800 |
| 5,652,838 A | 7/1997 | Lovett et al. |

FOREIGN PATENT DOCUMENTS

| | | |
|---|---|---|
| JP | 2281437 | 11/1990 |
| WO | WO 98/58372 | 12/1998 |
| WO | WO 99/38162 | 7/1999 |

OTHER PUBLICATIONS

"XP002130989 & JP 11 328742 A", Denon Co., Ltd., 11/99, abstract, Database WPI, Section EI, Week 200007, Derwent Publications Ltd., London, GB.

* cited by examiner

*Primary Examiner*—Ali Neyzari
(74) *Attorney, Agent, or Firm*—Antonelli, Terry, Stout & Kraus, LLP

(57) ABSTRACT

For providing a recording disc, on which information can be renewed by signals, such as electromagnetic waves, and further with which unnecessary vibration due to an eccentricity in center of gravity of the disc can be reduced when the disc is rotated at high rotation velocity, wherein there are positioned an antenna portion, which enables to receive information and/or electric power on the disc, and a memory chip(s) for transmitting the information received to the disc and for renewing that information. Further, for reducing the eccentricity in center of gravity of the disc, a counter balance and/or a label portion and/or the antenna portion and/or an other memory chip(s) and/or a battery are positioned so that they are in balance to the memory chip(s) on the disc.

7 Claims, 5 Drawing Sheets

DISC HAVING A SEMICONDUCTOR MEMORY

BACKGROUND OF THE INVENTION

1. Field of the Invention

The present invention relates to an optical disc having a memorizing means, into and from which data can be recorded and reproduced afterwards, separately from an area in which disc information is recorded.

2. Description of Related Art

In recent years, various systems are manufactured, wherein a recording disc is used as a recording medium, which can be produced easily through mass production and is high in reliability thereof. Representative examples of them are, for example, so-called a compact disc, being an optical disc for use in music (hereinafter, abbreviated by "CD"), a digital versatile disc, being an optical disc for use in video, such as movies (hereinafter, abbreviated by "DVD"), and CD-RM or DVD-ROM, being applied to for use of memorizing various data, such as application software and game software for use in computers, etc.

The optical discs, such as the CD, CD-ROM, DVD and DVD-ROM, etc., being made of plastic material, can be produced cheaply and in large quantity thereof by using a mold, as the discs in which data are already recorded. On the other hand, since they are for use in reproduction only (i.e., read only discs), data cannot be recorded afterward thereon. Therefore, it is impossible to process the data on the disc, so as to record the result thereof on the disc for reservation, nor to record the count number in using the disc, in a part thereof for reservation. Accordingly, when trying to apply the discs to an information management system, such as for reservation of the result of playing the game, etc., limitation or restriction for use of the application software and/or limitation or restriction for reproduction of the information, such as music and/or movies, they are inconvenient nor not necessarily convenient. Of course, there exists a disc on which such the data can be recorded, however, it cannot be produced cheaply in large quantity thereof in such the manner as mentioned above, but rather it comes to be expensive since it necessitates complex processes for manufacturing thereof. Also, when recording data, the data must be recorded onto each disc. Further, for recording, it is necessary to provide an optical head which has an output being higher comparing to that of and apparatus for reproducing only, therefore the price of a recording/reproducing apparatus comes to be expensive.

As, as a method for managing main information on a medium being by means of an other medium separated from that for the main information, there is known a system, in which a semiconductor memory is installed on a magnetic tape cartridge, wherein the management of the information on the magnetic tape is conducted by the semiconductor memory. However, in this case, the semiconductor memory is positioned in the cartridge main body, therefore the access to the semiconductor memory is conducted by contacting to it, directly. Accordingly, though it is possible to apply the method mentioned above into the medium of the disc type, so that such the semiconductor memory is installed on the disc, for example, however in that case, since the semiconductor memory is also rotated by itself with the disc, it has a problem that there is difficulty in transmission of the information thereof.

SUMMARY OF THE INVENTION

According to the present invention, it is an object to provide a recording disc for the exclusive use in reproduction (i.e., read-only disc), being made of plastic material, like such as the CD, CD-ROM, DVD, DVD-ROM, etc., which can be manufactured cheaply and can be recorded with a large amount of data thereon, wherein further management information can be recorded and reproduced afterward, with ease and certainty, for applying it to an information management system for the recorded information recorded on the disc, such as the games, the application software, the music and movies, etc., on which no additional information can be recorded afterward, and which can reserve the result of playing the game or can impose restrictions on using the application software or on the number of reproductions, for example.

Also, in such the case, there is caused a problem that vibration becomes large due to decentration or eccentricity in the center of gravity of the disc, when an other separated thing(s) (such as the semiconductor memory) is formed or provided on or in the disc. In particular, under the condition where high rotation velocity is required for the CD-ROM in the recent years, the influence brought by the eccentricity in the center of gravity is large. Further, for the DVD-ROM, there is established a regulation or standard in which the acceptable amount for the eccentricity in the center of gravity is determined, therefore it must be in accordance therewith.

Then, an object according to the present invention is to provide a recording disc, on which is provided a means being recordable afterwards, and which can reduce the eccentricity in the center of gravity for suppressing unnecessary vibration of an apparatus when rotating at high revolution or rotation velocity.

For dissolving the problems mentioned above, according to the present invention, there is provided a recording disc having a reproducible data recording area, comprising:
- an input means for electromagnetically inputting data;
- a data memory means for memorizing the data which is inputted through said input means;
- an output means for electromagnetically outputting the data which is memorized in said memory means; and
- a counter balance being provided at a position in an opposite side to a position where said memory means is positioned, on a basis of a rotation center of said disc, within the disc.

And, further, according to the present invention, for example, in the recording disc mentioned above, wherein the counter balance has a mass being nearly equal to that of the data memory means, and is positioned at a position being nearly centrosymmetric to the data memory means, on a basis of a rotation center of said disc.

Alternatively, according to the present invention, in the recording disc mentioned above, wherein said counter balance is provided with a portion in which the information can be written and/or a portion on which a label can be attached.

Alternatively, according to the present invention, in the recording disc mentioned above, wherein the input means and/or the output means are positioned so that the data memory means and the eccentricity in the center of gravity are in balance.

Alternatively, according to the present invention, in the recording disc mentioned above, wherein a plurality of data memory means are provided and are positioned, so that the eccentricity in the center of gravity due to each of the memory means is reduced.

Alternatively, according to the present invention, in the recording disc, in which are provided the plurality of data memory means, the output means for electromagnetically outputting the data recorded in said memory means, and the counter balance within the same disc, wherein they are positioned so that the eccentricity in the center of gravity due to the each means is reduced.

Further, according to the present invention, in the recording disc mentioned above, wherein the eccentricity in center of gravity of said disc is equal or less than 1.0 gcm.

And, further, according to the present invention, in the recording disc mentioned above, there are further provided an electric power input means for electromagnetically inputting electric power to said memory means, and/or a battery means being able to accumulate electric power which is supplied from an outside. Or, there is further provided a solar battery for supplying electric power to said memory means.

DESCRIPTION OF THE PREFERRED EMBODIMENTS

Figure 1A:
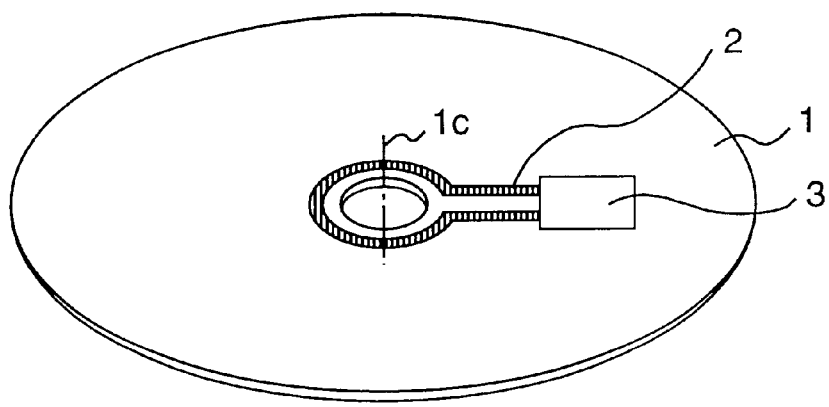
FIGS. 1(a) through (c) show various views for explaining a first embodiment of the present invention.
Figure 1B:
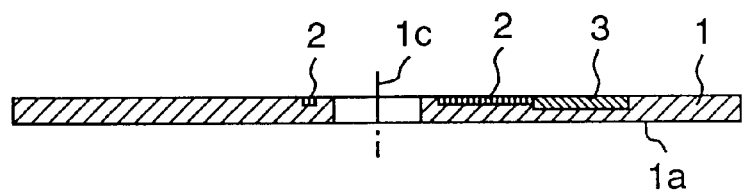
Figure 1C:
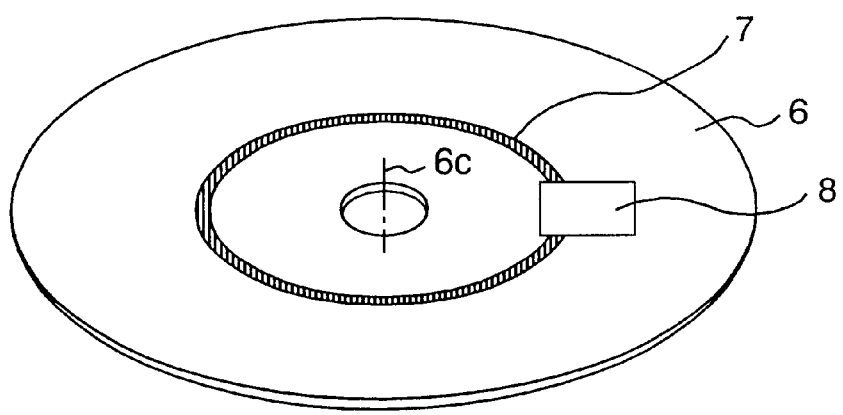

Hereinafter, detailed explanation of the embodiments according to the present invention will be given by referring to the attached drawings. FIGS. 1(a) through (c) show the first embodiment of the recording disc according to the present invention, in particular, the FIG. 1(a) shows a perspective view of the first embodiment of the present invention, and FIG. 1(b) a side cross-section view thereof. Here, a reference numeral 1 indicates a recording disc, and in particular, 1a a data recording area on the disc 1, in which the video information and/or computer information or the like are recorded or restored, 1c a rotation center of the disc, 2 an antenna, for example, being formed on the disc 1, as a means for use both as input and output means in common for transmitting information between an external equipment(s), such as a disc reproducing apparatus, and also as a power source input means for receiving electric power from an outside, and 3 a memory chip formed or provided on the disc 1 as a memory means for memorizing information to be transmitted between the external equipment(s) through the antenna 2 mentioned above. In this memory chip is memorized the information, for example, for use of reserving the result of playing the games, for use of restriction on using the application software, or for use of restriction on the reproductions of information of the music or movies, so that it can be reproduced or renewed by recording, thereby achieving to apply it into the information management system.

Here in FIG. 1(c) is shown a variation of the first embodiment. In the Figure, a reference numeral 6 depicts or indicates a disc, 6c a rotation center of the disc, 7 an antenna, being formed on the disc 6, for use both as input and output means in common, for transmitting information between the external equipment(s), and also as the power source input means for receiving electric power from an outside, and 8 a memory chip formed or provided on the disc 6, as the memory means for memorizing information to be transmitted between the external equipments) through the antenna 7 mentioned above. Effects or functions of them are similar to those mentioned in the above embodiment, therefore the explanation thereof will be omitted here. Here, as shown in the FIG. 1(c), the antenna 7 is not restricted in the shape thereof, but enough to be positioned on the disc 6 in the construction.

Figure 2A:
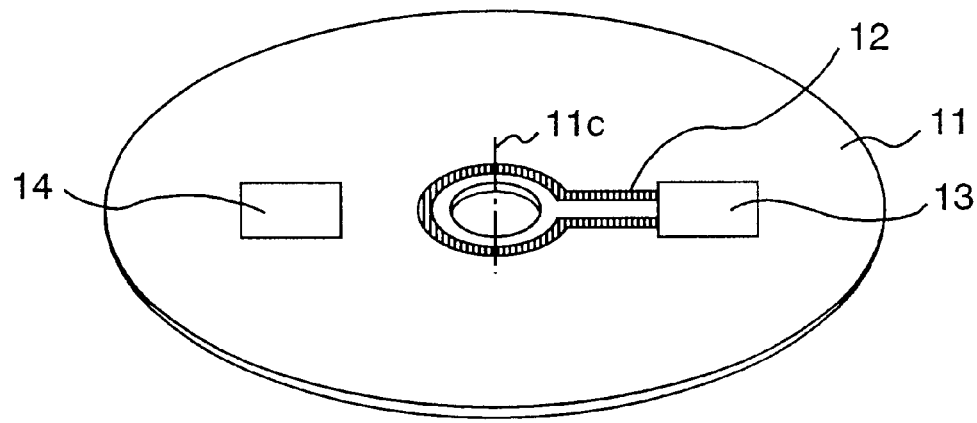
FIG. 2(a) through (c) show various views for explaining a second embodiment of the present invention.
Figure 2B:
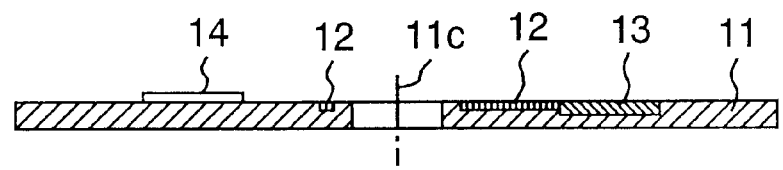
Figure 2C:
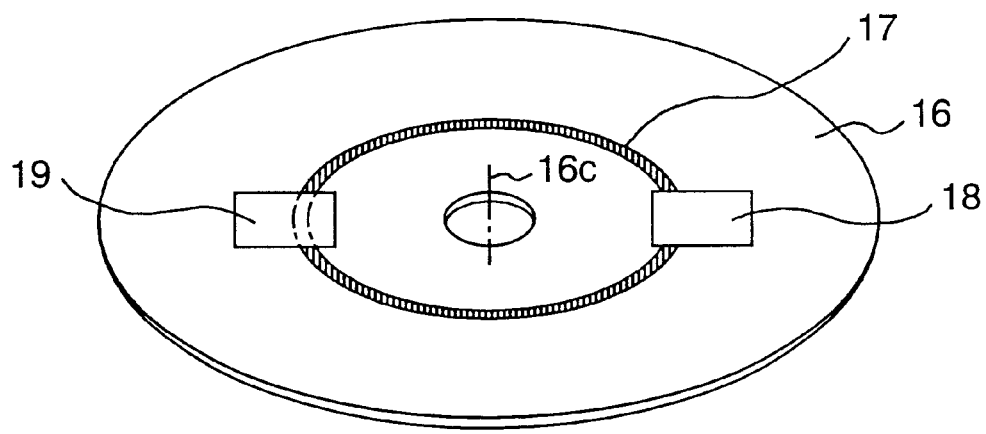

Continuously, a second embodiment will be shown in FIGS. 2(a) through (c). In particular, the FIG. 2(a) shows the perspective view of the second embodiment of the present invention, and the FIG. 2(b) the side section view thereof. Here also, a reference numeral 11 depicts a disc, 11c a rotation center of the disc, 12 an antenna, being formed on the disc 11, for use both as input and output means in common for transmitting information between the external equipment(s), and also as the power source input means for receiving electric power from an outside, 13 a memory chip formed or provided on the disc 11, as the memory means for memorizing information to be transmitted between the external equipment(s) through the antenna 12 mentioned above, and 14 a counter balance, being positioned in roughly opposite direction to the memory chip with respect to the rotation center 11c of the disc and formed for reducing the eccentricity in the center of gravity around the rotation center 11c of the disc. In the present embodiment, there is disclosed an example, in particular, in which the counter balance is provided at a position being almost centro- or point-symmetric to the memory chip with respect to the rotation center 11c of the disc. Also, in the present embodiment, there is shown the counter balance 14 having a quadrangular shape, however it is needless to say that it should not be restricted only to that.

Here, the eccentricity in the center of gravity means an amount which can be obtained by multiplying the total mass of the disc with a distance up to the center of gravity assuming the disc to be a system of material points from the rotation center, and it can be an index of the unbalance in the masses when the disc rotates. When the disc rotates at high velocity, to the eccentricity in the center of gravity is generated a centrifugal force being relative to a square of the revolution number of the disc. This centrifugal force, since it changes the direction thereof from moment to moment following the revolution of the disc, therefore is transmitted in a form of the vibration, through a motor for rotably driving the disc to a whole of a rotating apparatus, thereby causing a difficulty in the reproduction of the disc information with stability.

The maximum value of this eccentricity in the center of gravity is not regulated at the present time, in particular, for the CD disc and the CD-ROM disc, while it is determined at first in the regulation for the DVD disc, wherein it is determined to be equal or less than 1.0 gcm by taking the maximum values of the CD and CD-ROM discs available on the market. Also, in the disc on which the memory chip is amounted according to the present invention, assuming the high rotation of the disc, it is preferable to position the memory chip, the antenna and the counter balance, so that the eccentricity in the center of gravity comes to be equal or less than 1.0 gcm.

Also, the shape of the antenna 17 should not be restricted only to that which is shown, in particular, in the FIG. 2(c), it can be take various shapes other than that shown in the figure, but as far as the eccentricity in the center of gravity is reduced. Here, a reference numeral 16c depicts the rotation center, 18 the memory chip, and 9 the counter balance.

Figure 3A:
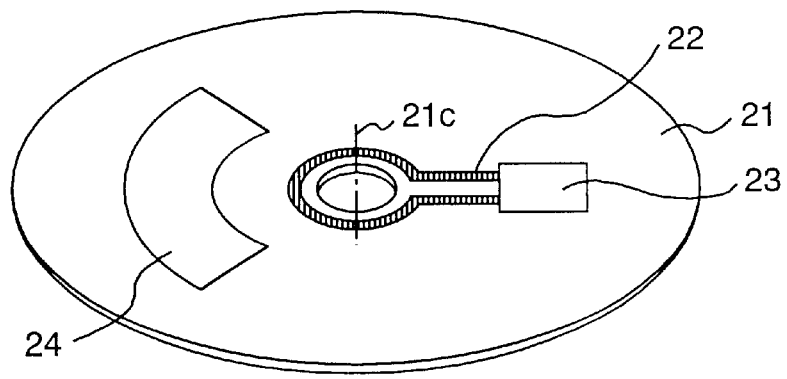
FIG. 3(a) and (b) show perspective and section views for explaining a third embodiment of the present invention.
Figure 3B:
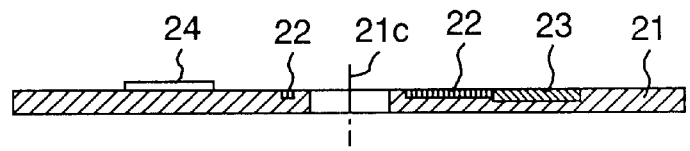

Continuously, a third embodiment will be explained by referring to FIGS. 3(a) and (b). In particular, the FIG. 3(a) shows the perspective view of the third embodiment of the present invention, and the FIG. 3(b) the side section view thereof. The third embodiment shown in those FIGS. 3(a) and (b) is characterized by a label provided, on which a user can write down an information of the disc and which can be attached on the disc, in a place of the counter balance according to the second embodiment mentioned above.

In the FIGS. 3(a) and (b), a reference numeral 21 depicts a disc, 21 c a rotation center of the disc, 22 an antenna for use both as input and output means in common for transmitting information between the external equipment(s), and also as the power source input means for receiving electric power from an outside, 23 a memory chip as the memory means for memorizing information to be transmitted between the external equipment(s) through the antenna 22, and 24 the label on which the user can write down freely about the disc contents, wherein the label also has an effect or function as the counter balance for canceling the eccentricity in the center of gravity, which is caused due to the provision of the antenna 22 and the memory chip 23 on the disc 21.

With the provision of this label 24 portion, as in the same manner shown in the second embodiment, the label 24 portion effects or functions as the counter balance, therefore it is possible to achieve or realize the reduction the eccentricity in the center of gravity which is caused by the unbalance in the masses of the memory chip and the antenna on the disc. Here, in the present embodiment, the label 24 is shown in an arc shape, however it is also needless to say that it should not be restricted only to that shape.

Figure 4:
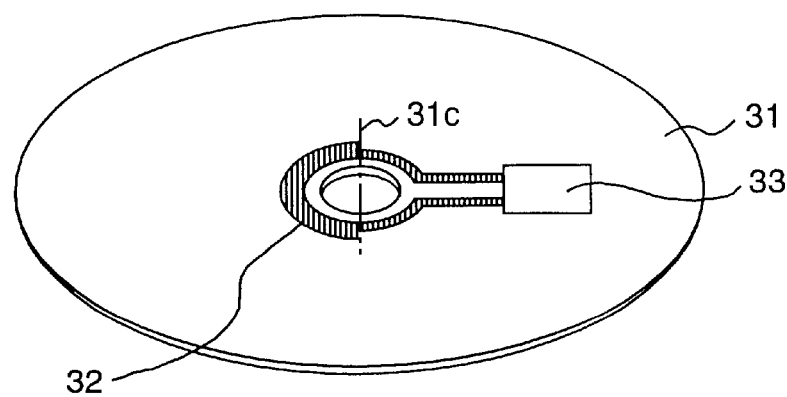
FIG. 4 shows a perspective for explaining a fourth embodiment of the present invention.

Continuously, a fourth embodiment will be explained by referring to FIG. 4. In the FIG. 4, a reference numeral 31 depicts a disc, 31c a rotation center of the disc, 32 an antenna for use both as input and output means in common for transmitting information between the external equipment(s), and also as the power source input means for receiving electric power from an outside, 33 a memory chip as the memory means for memorizing information to be transmitted between the external equipment(s) and the disc 31 through the antenna 32.

Here, the antenna 32 is positioned in the opposite direction to the memory chip with respect to the rotation center 31c of the disc and is enlarged in area or volume thereof, for reducing and/or canceling the eccentricity in the center of gravity which is caused in the memory chip on the disc, thereby increasing the mass thereof. As a result of this, it is possible to cancel the eccentricity in the center of gravity of the disc as a whole, with increasing the effect or function of that as the antenna.

Continuously, a fifth embodiment will be explained by referring to FIG. 5(a). In the FIG., a reference numeral 41 depicts a disc, 41c a rotation center of the disc, 42 an antenna for use both as input and output means in common for transmitting information between the external equipment(s), and also as the power source input means for receiving electric power from an outside, 43a and 43b memory chips as the memory means for memorizing information to be transmitted between the external equipment(s) through the antenna 42. Those memory chips 43a and 43b are positioned in almost opposite direction to each other with respect to the rotation center 41c of the disc, for canceling the eccentricity in the center of gravity to each other.

Figure 5B:
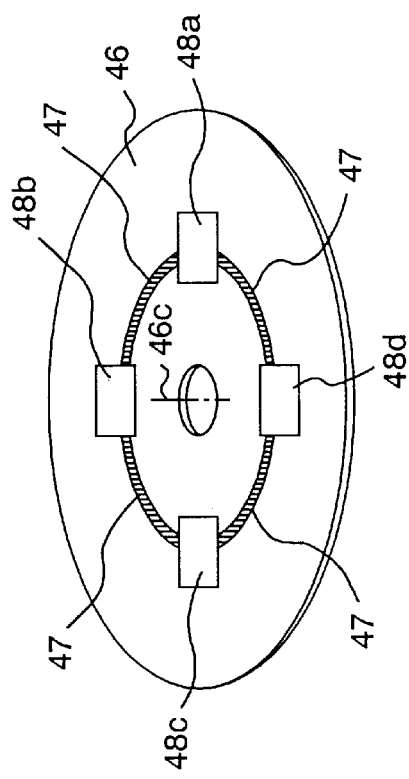
FIG. 5(a) through (d) show perspective views for explaining a fifth embodiment of the present invention and variations thereof.
Figure 5D:
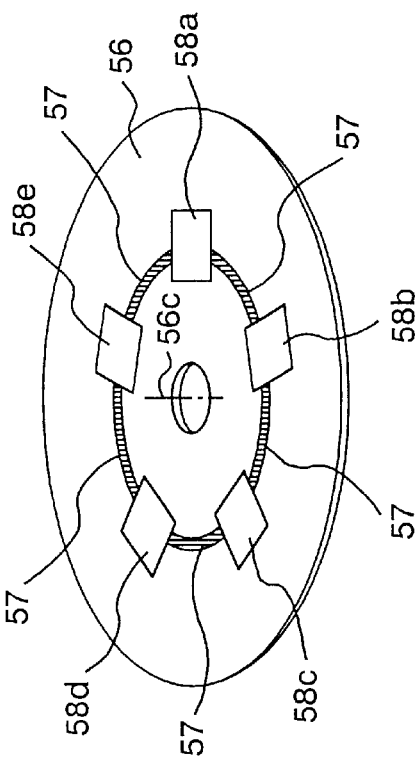
Figure 5A:
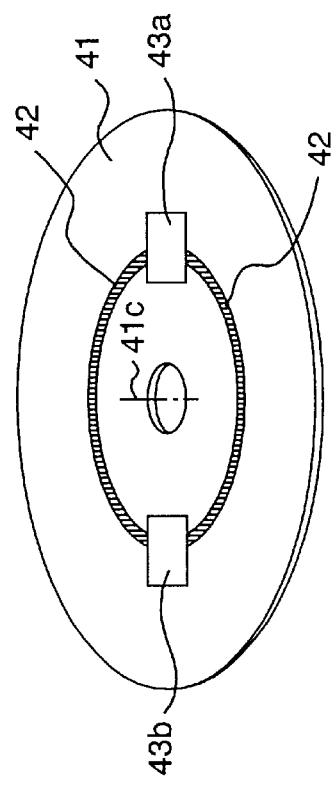
Figure 5C:
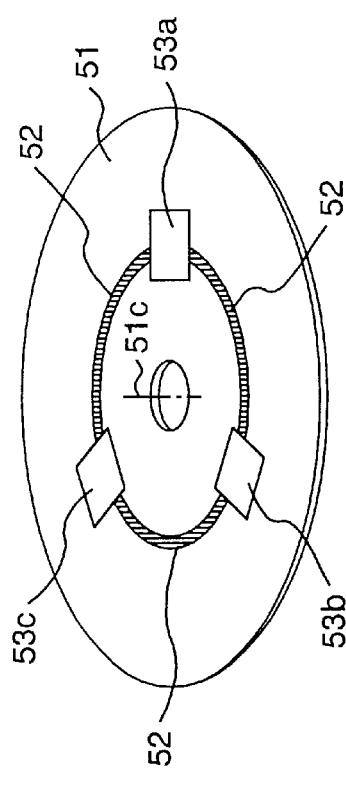

Also, other examples in which the number of the memory chips is further increased in the FIG. 5(a) are shown in FIG. 5(b), FIG. 5(c) and FIG. 5(d), respectively. In the FIG. 5(b), a reference numeral 46 depicts a rotation center of the disc, 47 an antenna, 48a, 48b, 48c and 48d memory chips, and in the FIG. 5(c), 51 a disc, 51c a rotation center of the disc, 52 an antenna, 53a, 53b and 53c memory chips, and in the FIG. 5(d), 56 a disc, 56c a rotation center of the disc, 57 an antenna, 58a, 58b, 58c, 58d and 58e memory chips, respectively.

Also, in those embodiments shown, there are shown only the cases where the memory chips are provided two (2) and four (4) in even numbers, and three (3) and five (5) in odd numbers, however the number of the memory chips should not be restricted only to those numbers, and there is no necessity of restriction on the number of the memory chips, on the size and the mass for each one thereof, nor on the positions thereof, as far as the memory chips can be positioned or arranged on the disc so that the eccentricity in the center of gravity of the disc comes to be reduced, comparing when only one memory chip is provided thereon.

Figure 6:
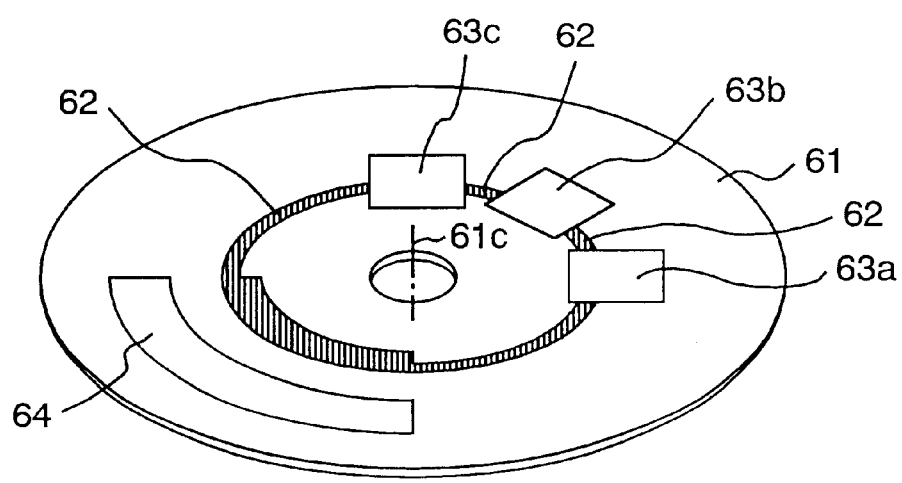
FIG. 6 shows a perspective for explaining a sixth embodiment of the present invention.

Continuously, a sixth embodiment will be explained by referring to FIG. 6. In the FIG. 6, a reference numeral 61 depicts a disc, 61c a rotation center of the disc, 62 an antenna, 63a, 63b and 63c memory chips, and 64a label on which the user can write down freely about the disc contents.

In the present embodiment of the present invention, for at least one or more of the memory chips on the disc 61, also the antennas 62 and the label 64 are formed or provided on the disc 61, respectively, so that the disc 61 as a whole is reduced in the eccentricity in the center of gravity thereof. However, the FIG. 6 shows only an embodiment, however the memory chips and the label or the like may be positioned differently, as far as the eccentricity in the center of gravity as a whole can be reduced.

Further, in those embodiments from the first to sixth mentioned in the above, it is explained that the electric power necessary for driving the memory means is supplied from an outside through the antenna, however it should not be restricted only to that, for example, a thin battery for driving the memory chips, a battery rechargeable with electric power supply from an outside, or a solar battery may be provided on the disc.

Here, an example of a method for positioning the constructive elements of the disc will be explained. Taking an axis being perpendicular to the rotation center of the disc on the disc surface, it is assumed that it is a X axis. Further, taking an axis lying on the disc surface including that X axis and being perpendicular to the X axis, it is assumed that it is a Y axis.

Here, first it is assumed that the mass of the memory chip(s) is m0, and that a distance from the rotation center to the position of the center of gravity of the memory chip(s) is r0. Here, r0 is a vector having an amplitude and a direction (the direction from the center to the position of the center of gravity of the memory chip(s), etc.). Then, the eccentricity in the center of gravity of the memory chip(s) can be described by m0·r0. In the same manner, assuming that the masses of the label, the antenna(s), etc., and the distances from the rotation center to the position of the center of gravity thereof are m1, r1, m2, r2 . . . , respectively, then the eccentricity in the center of gravity H of the disc as a whole, on which the constructive elements in the number n are installed or mounted, it can be expressed as below, when the X axis component of the eccentricity in the center of gravity of the constructive element of No. i is (mi·ri)x, and the Y axis component is (mi·ri)y, respectively:

$$|H| = \sqrt{\left\{\sum_{i=0}^{n}(m_i \cdot r_i)_x\right\}^2 + \left\{\sum_{i=0}^{n}(m_i \cdot r_i)_y\right\}^2}$$

Therefore, by positioning the constructive elements, such as the label(s), the antenna(s), the battery, etc., on the disc in such the manner that H is equal or less than 1.0 gcm (H≦1.0 gcm), it is possible to provide a disc which is small in the eccentricity in the center of gravity thereof, and further by suppressing the vibration of the disc apparatus not shown in the figure, it is possible to achieve high reliability even when the disc is rotated at the high rotation velocity.

As is mentioned in the above, in those embodiments from the first to the sixth explained heretofore, the input means and the output means for transmitting information between the external equipment, and the electric power input means for receiving the electric power from an outside are constructed or formed with only one antenna in common use, however there is no necessity to combine them in common, therefore they may be provided by each element thereof, independently.

According to the present invention, since the information relating to data on the disc can be recorded or reproduced afterwards, the disc can be applied for the information management system, such as for the reservation of results of playing the games, or for the restriction on use of application software or on the number of reproductions of music and movies. Also, since it is possible to reduce the eccentricity in the center of gravity of the disc, unnecessary vibration caused when the disc is rotated at the high rotation velocity can be suppressed, thereby enabling to maintain the stable rotation, as well as to obtain reproduction of the disc information with high reliability.

What is claimed is:

1. A recording disc having a reproducible data recording area, comprising:

an input part which electromagnetically inputs data;

at least one semiconductor memory part which memorizes the data inputted through said input part; and an output part which electromagnetically outputs the data memorized in said at least one semiconductor memory part;

wherein at least one of said input part, said at least one semiconductor memory part and said output part is positioned with respect to one another so that an eccentricity in center of gravity of said disc expressed as below, due to at least each said part is reduced to at least a set level which is no greater than 1.0 gcm when the disc is considered in the entirety thereof:

$$|H| = \sqrt{\left\{\sum_{i=0}^{n}(m_i \cdot r_i)_x\right\}^2 + \left\{\sum_{i=0}^{n}(m_i \cdot r_i)_y\right\}^2}$$

where, H is the eccentricity in the center of gravity of the disc in the entirety thereof, X and Y are X axis and Y axis which are perpendicular to each other on the disc surface, respectively, and $m_i$ and $r_i$ are mass and distance from the rotation center to the position of the center of gravity of a respective part of No. i, represented by the input part, the semiconductor memory part, and the output part, and $(m_i \cdot r_i)_x$ and $(m_i \cdot r_i)_y$ are X axis component and Y axis component of the eccentricity.

2. A recording disc as defined in claim 1, wherein the set level of the eccentricity in the center of gravity of the disc is 1.0 [g cm] gcm.

3. A recording disc as defined in claim 1, further comprising at least one of an electric power input part which electromagnetically inputs electric power to the at least one semiconductor memory part, and a battery which enables accumulation of electric power which is supplied from outside of the disc.

4. A recording disc as defined in claim 3, further comprising a solar battery for supplying electric power to the battery.

5. A recording disc having a reproducible data recording area, comprising:

an input part which electromagnetically inputs data;

an output part which electromagnetically outputs the data memorized in the at least one semiconductor memory part;

a portion in which the information can be written; and at least one of the input part, the at least one semiconductor memory part, the output part, the portion in which the information can be written and the portion on which a label can be attached are positioned with respect to one another so that an eccentricity in center of gravity of the disc as expressed below, due to at least each of the parts and portions is reduced to at least a set level which is no greater than 1.0 gcm when the disc is considered in the entirety thereof:

$$|H| = \sqrt{\left\{\sum_{i=0}^{n}(m_i \cdot r_i)_x\right\}^2 + \left\{\sum_{i=0}^{n}(m_i \cdot r_i)_y\right\}^2}$$

where, H is the eccentricity in the center of gravity of the disc in the entirety thereof, X and Y are X axis and Y axis which are perpendicular to each other on the disc surface, respectively, and $m_i$ and $r_i$ are mass and distance from the rotation center to the position of the center of gravity of a respective part of No. i, represented by the input part, the semiconductor memory part, and the output part, and $(m_i \cdot r_i)_x$ and $(m_i \cdot r_i)_y$ are X axis component and Y axis component of the eccentricity.

6. A recording disc as defined in claim 5, wherein said input part and output part are antennas, respectively.

7. A recording disc as defined in claim 5, wherein the set level of the eccentricity in the center of gravity of the disc is 1.0 gcm.

* * * * *